(No Model.) 2 Sheets—Sheet 1.

J. A. HOWELL.
CURTAIN ROLLER FOR COACHES.

No. 504,163. Patented Aug. 29, 1893.

Witnesses
Oscar A. Michel
John A. Westervelt

Inventor
John A. Howell,
By Drake & Co. Atty's.

(No Model.) 2 Sheets—Sheet 2.

J. A. HOWELL.
CURTAIN ROLLER FOR COACHES.

No. 504,163. Patented Aug. 29, 1893.

Witnesses
Oscar A. Michel
John A. Westervelt

Inventor:
John A. Howell,
By Drake & Co., Atty's.

UNITED STATES PATENT OFFICE.

JOHN A. HOWELL, OF NEWARK, NEW JERSEY, ASSIGNOR TO C. N. LOCKWOOD & CO., OF SAME PLACE.

CURTAIN-ROLLER FOR COACHES.

SPECIFICATION forming part of Letters Patent No. 504,163, dated August 29, 1893.

Application filed August 1, 1892. Serial No. 441,782. (No model.)

*To all whom it may concern:*

Be it known that I, JOHN A. HOWELL, a citizen of the United States, residing at Newark, in the county of Essex and State of New Jersey, have invented certain new and useful Improvements in Curtain-Rollers for Coaches; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of curtain rolls in which the detents are automatic both in their detaining and in their releasing operations and in which all releasing appliances such as cords and similar devices independent of the curtain are dispensed with.

The objects of the invention are to provide such an automatic curtain roll for coaches and similar vehicles, to render the roller noiseless in operation, convenient in assembling the parts and placing them in position in the coach, to avoid looseness of parts such as will produce a rattling effect when the coach is in motion and to reduce the cost of construction.

Further objects and advantages will be referred to in connection with the description of the working parts.

The invention consists in the improved curtain or shade roller for coaches and similar vehicles, and in the arrangements and combinations of parts, all substantially as will be hereinafter set forth and finally embodied in the clauses of the claim.

Figure 1:
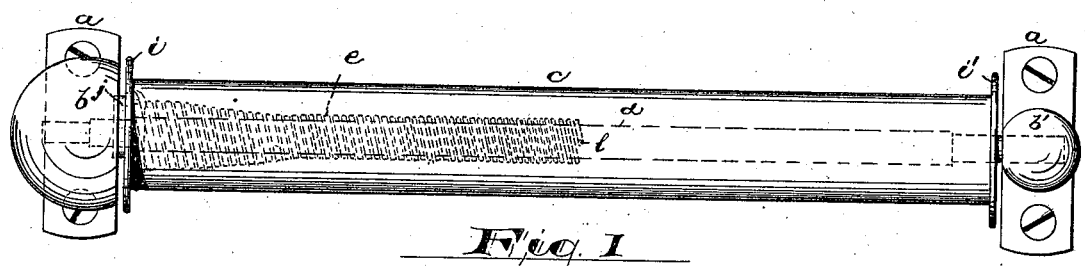
Figure 2:
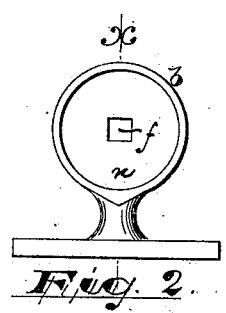
Figure 3:
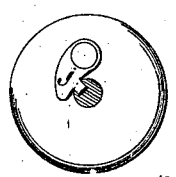
Figure 4:
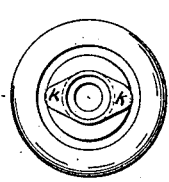
Figure 5:
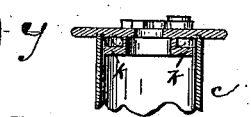
Figure 6:
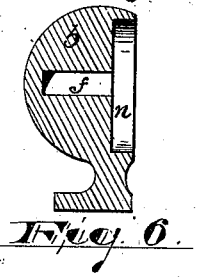
Figure 7:
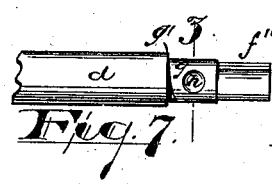
Figure 8:
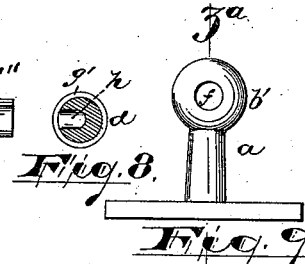
Figure 9:
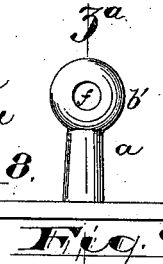
Figure 10:
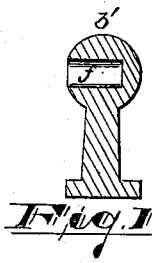
Figure 11:
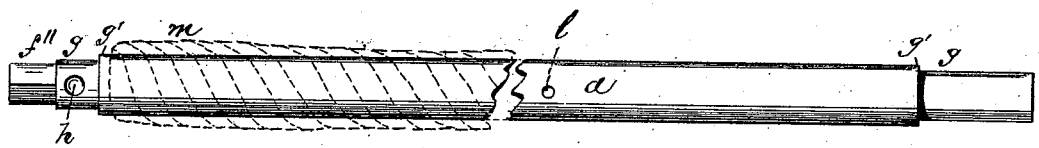
Figure 12:
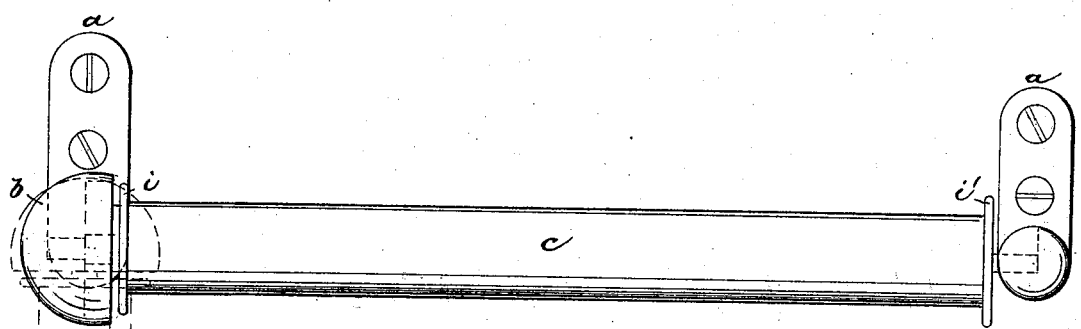
Figure 13:
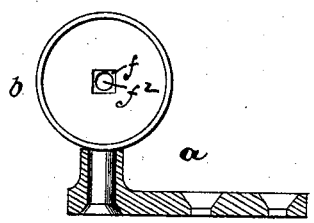
Figure 14:
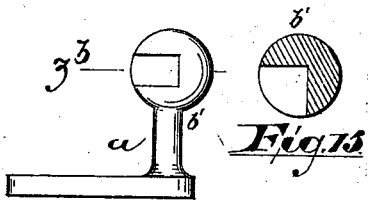
Figures 16, 17, 18:
Figure 19:
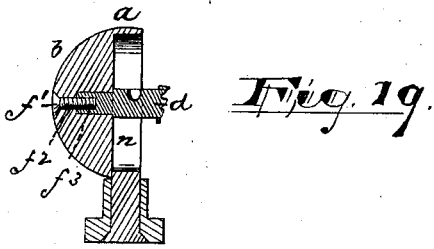

Referring to the accompanying drawings in which like letters indicate corresponding parts in each of the several views, Figure 1 is a front elevation of a curtain or shade roller of the improved construction. Fig. 2 is an inside view of one of the brackets therefor. Fig. 3 is an end view of the roller in detail, the pivotal rod being in section taken on line $z$, Fig. 7. Fig. 4 is an inside view of a curtain end-plate and Fig. 5 is a section of the same on line $y$, the roller tube being also shown in part. Fig. 6 is a sectional view of one of the end brackets or supports taken on line $x$, Fig. 2. Fig. 7 is a detail view of the end of a pivotal rod and Fig. 8 is a section of the same on line $z$. Fig. 9 is a detail view of another end bracket and Fig. 10 is a section of the same on line $z^a$, and Fig. 11 is a side view of the said pivotal rod. Fig. 12 shows the fixtures as applied to a landau. Figs. 13 and 19 are sectional views of a bracket for the same. Figs 14 and 15 are views of the other bracket, Fig. 15 being in section on line $z^b$. Figs. 16 and 17 are detail views showing the opposite sides of a curtain end plate or disk, and Fig. 18 is a section on line $z^c$.

In said drawings $a$, $a$, are brackets or supports for the roller, the same having projecting bearings $b$, $b'$, for the pivotal rod, $d$, of the roller $c$, in which bearings the said rod is held stationary so that there will be no looseness such as will produce a rattle when the vehicle is in motion.

The bearing, $b$, forms an imperforate cap which, in the preferred construction shown in Figs. 1 and 6, is devoid of any exteriorly projecting pawl, such for example as is shown in Patent No. 152,065, the said cap, on its recessed side extending over and engaging the outer faces of the end disks and thus entirely concealing the gravity pawls pivoted thereon. The holes, $f$, in said bearings, or at least one of them, are made angular, as in Fig. 2, or so that the rod, $d$, will not revolve therein, the said rod being made correspondingly angular, as at $f''$, in Figs. 7 and 11. Said rod, $d$, consists of a single piece of metal and extends from bracket to bracket and, near the extremities, is reduced in diameter, as at $g$, forming shoulders, $g'$, which limit the movement, laterally, in the roller. The reduced portion, $g$, is round in cross section, Fig. 8, to provide a proper pivotal bearing for the roller and, at one side, is bored out, as at $h$, in Figs. 3, 7, and 8, to form a catching recess for the roller pawl. By boring out the rod the opposite sides of the recess are made substantially parallel and the said sides fit the edges of the lug of the pawl, at the base thereof, so that there is a tendency to prevent vibration and noise when the carriage is in motion. The shoulder $g'$, formed at the inner end of the reduced part, tends to hold the disk carrying the pawl pivoted at the side thereof, so that the lug will lie in line with the recess or boring into which it is to enter and thus there is small chance for displacement.

The roller, c, is of sheet metal, preferably tin, and at its ends is provided with end disks or pieces, i, i', which are soldered or otherwise secured at the open ends of the tubular part of the roller. To one of these disks, both of which are perforated at the center, the hole being of the size of the reduced part of the pivotal rod, fitting with sufficient closeness to prevent rattling but allowing a free pivotal movement, is secured the pawl j, which is pivotally riveted upon the outer side of the said disk as shown in Fig. 3. On the inner side of the same disk, it is provided with bearings, such as the arms k, k, for holding the spring, the opposite end of said spring being held to the rod, d, by perforating said rod as at l, Fig. 11 and passing the end of the spring through the perforation, or in any other manner. The arms k, k, on the inner side of the end disks are integral therewith and hold the spring to the said end disk when the same is away from the cylindrical or tubular body in assembling the parts and prevent said spring from drawing away from said end disk as it would in the event of the use of a mere perforation in the end disk and the insertion of the extremity of the spring therein. Around said metallic rod, within the spring, is a cushion, m, formed by wrapping muslin or other non-sonorous material around the rod. This also tends to prevent noise when the carriage is in motion.

To prevent rattling at the bearing i', and yet allow thereat sufficient freedom of movement, I have constructed the same as clearly shown in Fig. 18, in which said bearing is shown to be provided on the inner side with an annular flange, $i^2$, formed at a little distance back from, though concentric with, the journal hole $i^3$. Within the socket formed by said flange is arranged a hard rubber or similar non-sonorous washer $i^4$ which projects within the diametric limits of said hole, $i^3$, Fig. 16, so as to take the bearings of the rod, and prevent the noise such as would be produced by metallic engagement. The non-metallic washer is held in place by turning the edge of the annular flange as at $a^5$.

When the device is employed in connection with a landau, and it becomes necessary to disengage the rod from the bearing b' and turn the roller and rod as indicated in Fig. 12, I form the pawl covering bearing, b, as shown in Fig. 19 where said bearing is swiveled on the bracket to admit of its turning with the rod d, and roller c, and said rod is held to said bearing by a screw, f', which enters through the hole $f^2$ of said bearing and into said rod, the said rod having a threaded screw hole, $f^3$, at the axial center of the extremity.

To secure a full width of curtain at the window so that there will be no space between the window frame and the edge of said curtain, the end pieces are made very narrow or thin so as not to occupy material space laterally, and to hide the pawl from sight I have formed in the bracket b a pawl chamber n in which the said pawl turns with the roller, the outer walls of the chamber serving to hold the pawl in place against centrifugal force.

By the construction described, I am enabled to assemble the parts as follows: The tube being formed and the disk, i', soldered thereto, and the rod, spring and disk, i, with its pawl being fastened together in their relative positions, the said rods and parts carried thereby are slipped through the tube and into the fixed disk, the second disk i, being slipped over the angular bearing f'' and over the hole in the round portion g, to bear against the shoulder g' and engage the end of the tube d, when the said disk is soldered to said tube and the roller is complete for use.

The operation of the roller is similar to that of the ordinary spring rollers having automatic detents and further description is thought to be unnecessary.

Having thus described the invention, what I claim as new is—

1. The improved curtain roller for coaches in which is combined with a tubular sheet-metal roller open at opposite ends and a one piece metal rod, d, extending through said roller and projecting therefrom to engage brackets a, a, in which said rod is immovably fixed, said rod being reduced in diameter, as at g, to form, near one end, a shoulder g', the reduced part being round in cross section and bored out at one side as at h, end pieces i, i', centrally perforated to receive the reduced end of the rod, and soldered to the open ends of the roller, a pawl j pivotally riveted upon the outer face of one of said end pieces and adapted to enter the boring, h, to hold the roller stationary and said brackets a, a, holding said rod stationary and one of them being recessed and entirely covering the pawls on the face of the end piece, and a spring, all said parts being arranged and combined substantially as set forth.

2. In combination with the tubular roller, rod d, brackets a, a, and spring, end pieces having pawls on the outer side and spring holding bearing arms k, k, on the inner side, substantially as set forth.

3. In combination, a roller c having end disks one of which is provided with flange, $i^2$, and non-sonorous bearing $i^4$, held by said flange, and the other at one side with a spring bearing, k, and at the opposite side with a pawl, j, a rod d having the angular extremity f'' the round bearing g, with the hole or pawl recess h, therein and a shoulder g' and having a hole $f^3$ in its extremity, a spring e, and bracket bearings b, b', one of which admits the removal of the rod therefrom and the other of which is swiveled and is provided with a screw f' substantially as set forth.

4. In combination with the tubular body, end pieces or disks adapted to be secured thereto after the insertion of the spring and rod into said body, and having a projecting arm, $k$, to receive the spring and admit of the same being fastened thereon, a pawl on the outer side of said disk, to engage the rod and prevent the body from turning, said rod and spring the latter being secured upon said arm, substantially as set forth.

In testimony that I claim the foregoing I have hereunto set my hand this 27th day of July, 1892.

JOHN A. HOWELL.

Witnesses:
CHARLES H. PELL,
OSCAR A. MICHEL.